(12) United States Patent
Shin et al.

(10) Patent No.: US 8,441,916 B2
(45) Date of Patent: May 14, 2013

(54) METHOD OF COMMUNICATING FOR SMART UTILITY NETWORK USING TV WHITE SPACE AND APPARATUS FOR THE SAME

(75) Inventors: Cheol-Ho Shin, Daejeon (KR); Sang-Sung Choi, Daejeon (KR); Byoung-Hak Kim, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 360 days.

(21) Appl. No.: 12/827,252

(22) Filed: Jun. 30, 2010

(65) Prior Publication Data

US 2011/0002416 A1    Jan. 6, 2011

(30) Foreign Application Priority Data

Jul. 2, 2009   (KR) .......................... 10-2009-0060046
Feb. 1, 2010   (KR) .......................... 10-2010-0009095

(51) Int. Cl.
*H04J 11/00*    (2006.01)

(52) U.S. Cl.
USPC .......................... 370/208; 375/259; 375/260

(58) Field of Classification Search .................. None
See application file for complete search history.

(56) References Cited

U.S. PATENT DOCUMENTS 6,624,532 B1 *   9/2003   Davidow et al. ................ 307/39
2007/0133658 A1 *   6/2007   Shin et al. ...................... 375/131
2008/0107194 A1 *   5/2008   Cho et al. ....................... 375/260
2010/0158170 A1 *   6/2010   Li et al. .......................... 375/346

(Continued)

FOREIGN PATENT DOCUMENTS

| KR | 10-0547758 | 10/2006 |
| KR | 10-0769671 | 10/2007 |
| KR | 1020090057276 | 6/2009 |

OTHER PUBLICATIONS

FCC 08-260, Second Report and Order and Memorandum Opinion and Order, Nov. 4, 2008, Federal Communications Commission, pp. 1-40.*

(Continued)

*Primary Examiner* — Joseph Avellino
*Assistant Examiner* — Tsung Wu
(74) *Attorney, Agent, or Firm* — Nelson Mullins Riley & Scarborough LLP; EuiHoon Lee, Esq.

(57) ABSTRACT

There are disclosed a method of communicating for a smart utility network using a TV white space and an apparatus for the same. The method of communicating for a smart utility network using a TV white space according to the present invention includes: generating a time domain sequence repeated every predetermined number of samples; generating an OFDM symbol having a cyclic prefix length corresponding to an FFT size divided by a natural number of 2 or more and including samples of a number corresponding to the sum of the FFT size and the cyclic prefix length; and generating an SUN packet to be transmitted through a TV channel band selected in the TV white space by using the time domain sequence and the OFDM symbol. Accordingly, it is possible to satisfy all requirements required by the IEEE 802.15.4g SUN standardization group.

20 Claims, 7 Drawing Sheets

U.S. PATENT DOCUMENTS

2010/0266078 A1* 10/2010 Nakayama et al. ........... 375/346
2011/0110458 A1* 5/2011 Siohan et al. ................. 375/295

OTHER PUBLICATIONS

Kristensen et al, Reduced Transceiver-Delay for OFDM System, 2004, IEEE, All Pages.*

IEEE Standard 802.15.4, Wireless Medium Access Control (MAC) and Physical Layer (PHY) Specifications for Low-Rate Wireless Personal Area Networks (WPANs), 2006, IEEE, pp. 1-26.*

IEEE Standard 802.16, Air Interface for Broadband Wireless Access Systems, May 29, 2009, IEEE, pp. 1-43, 617-638, 937-955, 1358-1369.*

Tonello et al, An Efficient Wavelet Based Filtered Multitone Modulation Scheme, 2004, Proceedings of International Symposium on Wireless Personal Multimedia Communications (WPMC 04). All Pages.*

* cited by examiner

METHOD OF COMMUNICATING FOR SMART UTILITY NETWORK USING TV WHITE SPACE AND APPARATUS FOR THE SAME

CROSS REFERENCE TO RELATED APPLICATIONS

This application claims priority to Korean Patent Application No. 10-2009-0060046 filed on Jul. 2, 2009 and Korean Patent Application No. 10-2010-0009095 filed on Feb. 1, 2010, the entire contents of which are herein incorporated by reference.

BACKGROUND OF THE INVENTION

1. Field of the Invention

The present invention relates to an OFDM communication system, and more particularly, to the structure of an OFDM-based smart utility network (SUN) system capable of satisfying system requirements of IEEE 802.15.4 g.

2. Description of the Related Art

A smart grid is an intelligent power network that is being actively promoted in countries around the world, which aims at saving cost through efficient energy management, reducing less carbon through production and linkage of renewable energy, etc. Advanced countries such as U.S.A., Europe, etc. have been promoting various IT-based power network policies from the beginning of 2000 and even in Korea, national policies and strategies relating to the smart grid have been promoted since 2009.

An IEEE 802.15.4 g task group has focused on standardizing a smart utility network (SUN) physical (PHY) layer that is used as a wireless management network of the smart grid since May 2009 and has been proposing a wireless system technology capable of being designed to have low power consumption and providing high link margin characteristics to overcome a poor radio wave environment are being proposed.

Meanwhile, the Federal Communications Commission (FCC) has unanimously passed a proposal to permit use of a white space which is a non-use TV frequency band without a license in November 2008. In the case of the TV white space, standardization for a new service using the white space is being prepared in IEEE 802.11, 802.15, 802.16, and 802.22 as the most preferable frequency bands in a wireless communication.

Korean patent laid open publication Nos. 10-2004-0077279 and 10-2009-0057276 disclose "Apparatus and Method for Transmitting and Receiving Preamble of Ultra-wideband Communication System" and "Cost-efficient Preamble Structure for High-speed Communication of Packetized System", respectively. The patent laid open publications disclose a method of discriminating a synchronization preamble primarily using a time domain signal and a channel estimating preamble primarily using a frequency domain signal from each other and forming the preambles of two domains, in configuring an OFDM transmission type preamble.

Further, Korean patent laid open publication No. 10-2006-0093224 discloses "MB-OFDM Transmitting/Receiving Apparatus and Method of Processing Signal Thereof". Korean patent laid open publication No. 10-2006-0093224 discloses an interleaving data mapping technology capable of improving frequency diversity for the same data and diversity for adjacent data bits by performing a repeating operation, a shift operation, or a reverse operation for input data bits without increasing complexity in implementing hardware of the existing digital transmitting apparatus and receiving apparatus particularly in an OFDM signal processing method.

However, since the prior arts do not consider at all the high link margin characteristics to achieve low power consumption and overcome the poor radio wave environment required by the IEEE 802.15.4 g SUN standardization group, a new OFDM system structure capable of satisfying the requirements for the smart grid while minimizing an increase of system complexity has been needed.

Furthermore, the necessity of the OFDM system structures is markedly on the rise, such as a preamble structure, an OFDM symbol structure, etc. that are capable of utilizing the TV white space usable without a license at this point when the TV white space can be utilized and efficiently satisfying the requirements of the smart utility network (SUN) for the smart grid.

SUMMARY OF THE INVENTION

In order to solve the problems, an object of the present invention is to provide an OFDM system structure capable of using a TV white space usable without a license as a physical standard of a smart utility network (SUN) which is being standardized by IEEE 802.15.4 g.

Further, another object of the present invention is to provide an OFDM system structure which can be implemented using low-power consumption and a low-price system by simplifying a transmission/reception structure while overcoming fading caused due to a multipath delay of 20 us or more with a frequency offset tolerance of 20 ppm.

In addition, yet another object of the present invention is to provide an OFDM system structure capable of satisfying requirements such as achieving of a data rate of approximately the maximum 1 Mbps and configuring three or more piconets by using a TV white space which the US FCC allowed to be used with respect to an unlicensed terminal in November 2008.

In order to achieve the above object, a method of communicating for a smart utility network using a TV white space according to an aspect of the present invention includes: generating a time domain sequence repeated every predetermined number of samples; generating an OFDM symbol having a cyclic prefix length corresponding to an FFT size divided by a natural number of 2 or more and including samples of a number corresponding to the sum of the FFT size and the cyclic prefix length; and generating an SUN packet to be transmitted through a TV channel band selected in the TV white space by using the time domain sequence and the OFDM symbol.

In this case, the predetermined number of samples may be 16.

Further, the samples may be sampled by the sampling clock frequency set to allocate four smart utility network channels to the selected TV channel band.

In addition, the TV channel band may be 6 MHz and the sampling clock frequency may be 1.25 MHz.

In this case, each of the smart utility network channels may include 128 logical frequency subcarriers including 19 guard subcarriers, 8 pilot subcarriers, and 100 data subcarriers.

In this case, the FFT size may be 128, the cyclic prefix length may be 32, and the OFDM symbol may include 160 samples.

In this case, the SUN packet may include the time domain sequence and a channel estimation sequence, a header, and a payload generated using the OFDM symbol.

Further, an apparatus of communicating for a smart utility network using a TV white space according to another aspect of the present invention includes: a time domain sequence generator generating a time domain sequence repeated every predetermined number of samples; an OFDM symbol generator generating an OFDM symbol having a cyclic prefix length corresponding to an FFT size divided by a natural number of 2 or more and including samples of a number corresponding to the sum of the FFT size and a cyclic prefix length; and an SUN packet generator generating an SUN packet to be transmitted through a TV channel band selected in the TV white space by using the time domain sequence and the OFDM symbol.

In this case, the smart utility network communicating method or the smart utility network communicating apparatus may use 1/2 coding rate, use any one modulation/demodulation scheme of BPSK and QPSK, and use at least one of frequency domain spreading and time domain spreading.

According to the present invention, it is possible to satisfy all physical standard requirements of a smart utility network (SUN) which is being standardized by IEEE 802.15.4 g using a TV white space usable without a license.

Further, the present invention can implement a low-price system by using a crystal having a frequency offset tolerance of 20 ppm and overcome fading caused due to a multipath delay of 20 us or more without an excessive throughput loss.

In addition, the present invention can configure three or more piconets at once by using a TV white space which US FCC allowed to be used with respect to an unlicensed terminal in November 2008.

Besides, the present invention can satisfy both requirements such as configuring of three or more piconets, a low power consumption system having a simple structure, a high link margin to be operable in a poor channel environment such as a basement and a requirement such as using of an unlicensed frequency that are required by an IEEE 802.15.4 g SUN standardization group to thereby be utilized to configure an intelligent bidirectional communication network between a supplier and a consumer for automation of electric power, gas, water supply consumption measurements, etc. and efficient energy management hereafter.

DETAILED DESCRIPTION OF THE PREFERRED EMBODIMENTS

Hereinafter, the present invention will be described in detail with reference to the accompanying drawings. Herein, the detailed description of a related known function or configuration that may make the purpose of the present invention unnecessarily ambiguous in describing the present invention will be omitted. Embodiments of the present invention are provided so that those skilled in the art can more completely understand the present invention. Accordingly, the shape, the size, etc., of elements in the figures may be exaggerated for explicit comprehension.

Hereinafter, preferred embodiments of the present invention will be described in detail with reference to the accompanying drawings.

Figure 1:
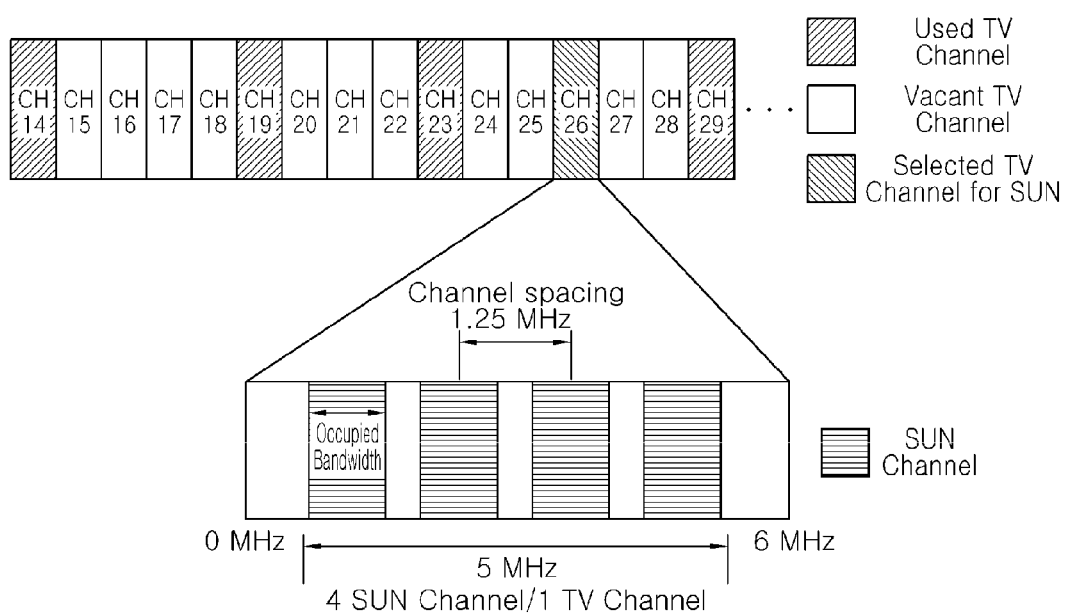
FIG. 1 is a diagram showing allocation of a smart utility network channel using a TV white space according to an embodiment of the present invention.

FIG. 1 is a diagram showing allocation of a smart utility network channel using a TV white space according to an embodiment of the present invention.

Referring to FIG. 1, four smart utility network channels are allocated to a TV channel band (CH26) selected for allocation of the smart utility network channel.

The Federal Communications Commission (FCC) has unanimously passed a proposal to permit use of a white space which is a non-use TV frequency band without a license in November 2008. In the case of the TV white space, standardization for a new service using the white space is being prepared in IEEE 802.11, 802.15, 802.16, and 802.22 as the most preferable frequency bands in a wireless communication.

In this case, the TV white space may be a band in the range of 512 MH to 698 MHz or a band corresponding to UHF channels 21 to 51 (except for channel 37 of 608 to 614 MHz).

In Korea and U.S., the bandwidth of one TV channel is 6 MHz. 6 MHz is fractioned into three or more channels and used in order to form three or more piconets which are the requirements of a smart utility network (SUN) system by using the TV white space. In the OFDM-based smart utility network system shown in FIG. 1, in order to prevent adjacent channel interference between the TV channel selected for allocation of the smart utility network system channel and the existing TV channel, only 5 MHz of the center among 6 MHz of one TV channel is used. In this case, the 5 MHz band may include four smart utility network channels of 1.25 MHz channel spacing/sampling clock.

Figure 2:
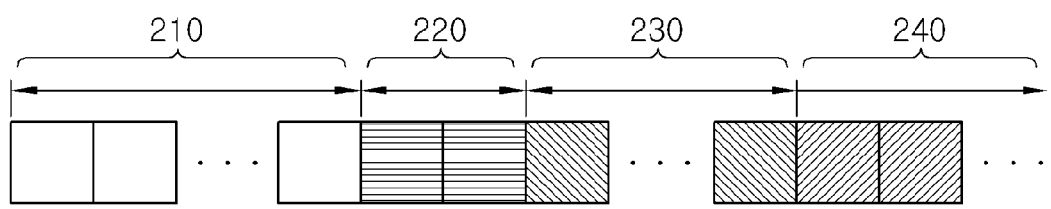
FIG. 2 is a diagram showing an SUN packet according to an embodiment of the present invention.

FIG. 2 is a diagram showing an SUN packet according to an embodiment of the present invention.

Referring to FIG. 2, the SUN packet according to the embodiment of the present invention may include a time domain sequence 210, a channel estimation sequence 220, a header 230, and a payload 240.

In order to implement the smart utility network system at low cost, a frequency offset can be estimated and compensated in a receiver even though a low-cost crystal allowing a frequency error of +/−20 ppm is used.

The time domain sequence 210 for acquiring synchronization in a symbol structure shown in FIG. 2 is constituted by a sequence having an excellent correlation characteristic for symbol timing estimation, AGC setting, and coarse carrier frequency estimation/compensation. Using a long sequence is advantageous for the symbol timing synchronization and the AGC setting, but the length of the time domain sequence needs to be limited in order to secure a sufficient offset estimation range to estimate and compensate the maximum frequency offset of +/−20 ppm at the time of considering an operating carrier frequency and an operating clock frequency.

The channel estimation sequence 220 is used for fine carrier frequency estimation and channel estimation.

The header 230 may include a physical (PHY) header and a MAC header.

The payload 240 may include data.

When the carrier frequency estimation and the channel estimation are completed, a tracking algorithm using the header 230 may be performed.

The time domain sequence 210 and the channel estimation sequence 220 may correspond to a preamble in the example shown in FIG. 2.

A sampling clock of a system having channel spacing of 1.25 MHz may be defined as 1.25 MHz and a sample interval of an OFDM symbol is 0.8 us (1/1.25 MHz). In order to operate the system using the sampling clock in a TV white space band, the frequency offset of +/−20 ppm must be able to be estimated within an RF carrier frequency of 698 MHz corresponding to a frequency of the worse case. As a result, the maximum frequency offset of the TV white space is 13.96 KHz (0.698*20) and one-cycle duration is approximately 71.6 us at the maximum frequency offset.

Figure 3:
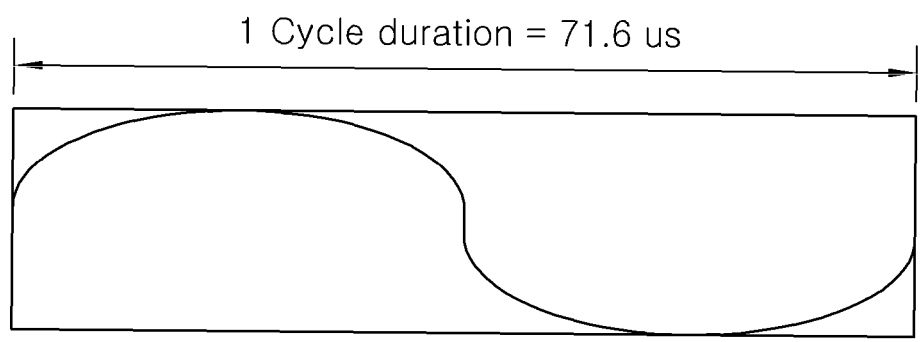
FIG. 3 is a diagram showing a one-cycle length of the maximum allowable frequency offset when a crystal having the maximum frequency tolerance of 20 ppm is used in a TV white space.

FIG. 3 is a diagram showing the one-cycle duration of the maximum frequency offset when a crystal having the maximum frequency tolerance of 20 ppm is use in the TV white space.

Referring to FIG. 3, the one-cycle duration of the maximum frequency offset is 71.6 us and a time domain sequence cycle may be set to overcome the maximum frequency offset having the one-cycle duration of 71.6 us.

Through a simulation using an algorithm to estimate a frequency offset between a transmitter and a receiver by using a phase difference between two received time domain sequences, it can be verified that the time domain sequence cycle must be smaller than approximately ⅕ cycle of the one-cycle duration of the maximum frequency offset in order to ensure receiving performance.

The maximum value of the time domain sequence cycle required to compensate the maximum frequency offset of 13.96 KHz is 14.32 us (71.6 us/5). Since the sample interval (1/sampling frequency) is 0.8 us, approximately the maximum 17 samples may be included during the time domain sequence cycle.

Figure 4:
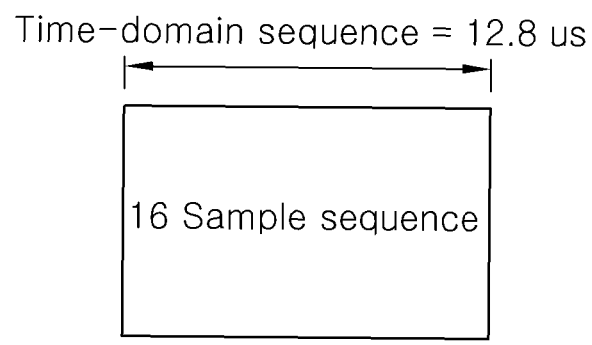
FIG. 4 is a diagram showing one cycle of one example of a time domain sequence shown in FIG. 2.

FIG. 4 is a diagram showing one cycle of one example of a time domain sequence shown in FIG. 2.

Referring to FIG. 4, the time domain sequence is repeated every 16 samples. That is, the time domain sequence has a sequence cycle of 16 samples and the sequence cycle is 12.8 us.

An operating distance of 1 Km or more is required for the smart utility network system and it is generally required to endure fading caused by a multipath delay of 20 us or more.

Figure 5:
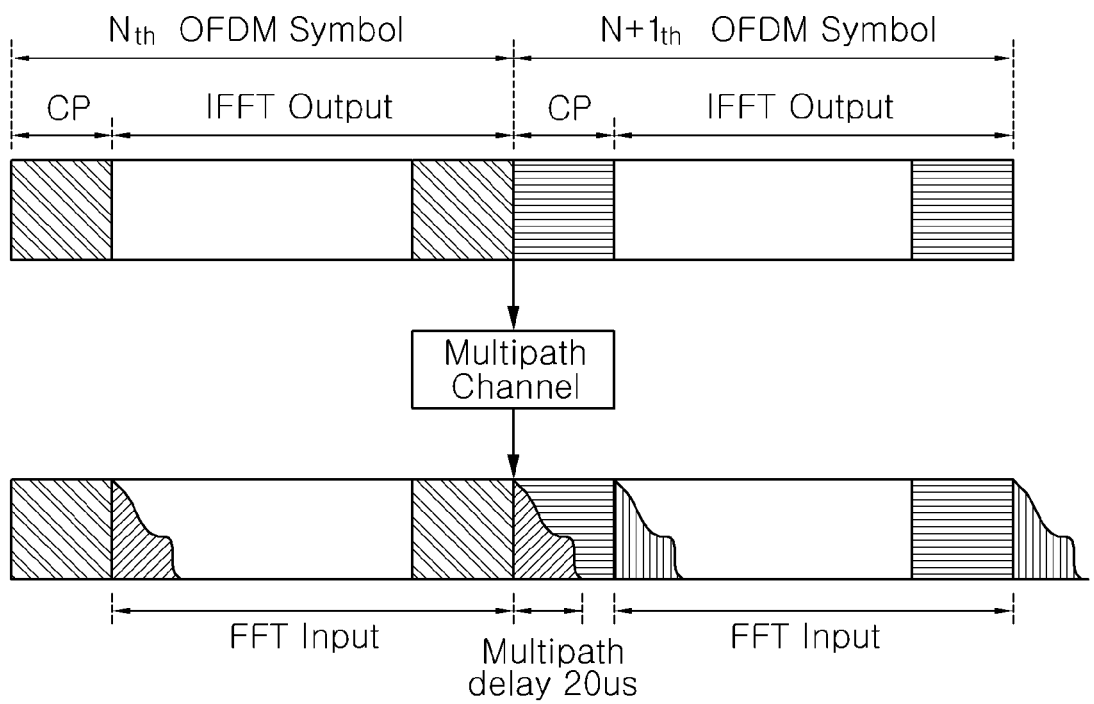
FIG. 5 is a diagram showing a multipath delay and a cyclic prefix.

FIG. 5 is a diagram showing a multipath delay and a cyclic prefix.

Referring to FIG. 5, in order to overcome the fading caused by the multipath delay, a cyclic prefix period of the multipath delay or more is required.

Figure 6:
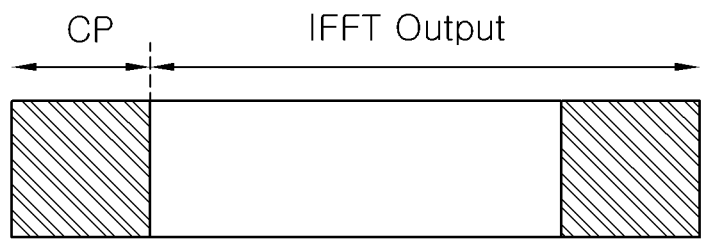
FIG. 6 is a diagram showing an OFDM symbol structure including a cyclic prefix.

The OFDM symbol has a structure shown in FIG. 6 by previously transmitting approximately ¼ of actually transmitted data depending on an IFFT result to a prefix of an IFFT output value as a cyclic prefix CP in order to overcome the fading caused by the multipath delay within a range not to excessively damage a transmission throughput.

FIG. 6 is a diagram showing an OFDM symbol structure including a cyclic prefix.

Referring to FIG. 6, a part of the IFFT output value is repeated in the cycle prefix.

In order for the smart utility network system to endure the multipath fading of 20 us, the cyclic prefix must include 25 (20 us/0.8 us) or more samples when the sampling clock is 1.25 MHz.

When the cyclic prefix includes 25 or more samples, the length of the IFFT output must be 100 or more. Since the IFFT/FFT size must have a multiple value of 2 for implementation, it may be determined as 128 (2^7) and the cyclic prefix may include 32 samples.

Figure 7:
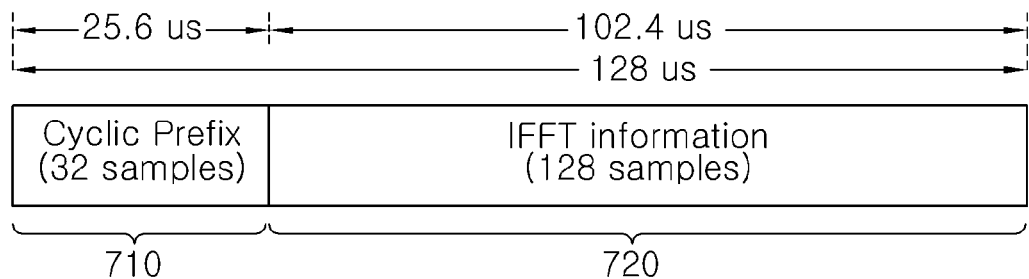
FIG. 7 is a diagram showing an OFDM symbol structure adopted in a channel estimation sequence, a header, and a payload of an SUN packet shown in FIG. 2.

FIG. 7 is a diagram showing an OFDM symbol structure adopted in a channel estimation sequence, a header, and a payload of an SUN packet shown in FIG. 2.

Referring to FIG. 7, the OFDM symbol includes a cyclic prefix CP 710 including 32 samples and an IFFT output 720 including 128 samples.

The OFDM symbol of the channel estimation sequence, the header and the payload shown in FIG. 2 may have the number of samples shown in FIG. 7.

In the example shown in FIG. 7, the cyclic prefix 710 is positioned at the prefix of the OFDM symbol, but in the present invention, the cyclic prefix 710 is not always positioned at the prefix of the OFDM symbol. For example, the cyclic prefix 710 may be positioned at the suffix of the OFDM symbol and in some of the OFDM symbols, the cyclic prefix 710 may be positioned at the prefix of the OFDM symbol and in the rest of the symbols, the cyclic prefix 710 may be positioned at the suffix of the OFDM symbol.

In order to generate the time domain sequence repeated every 16 samples shown in FIG. 4 by using a 128 FFT/IFFT structure, a 128 IFFT input shown in Equation 1 may be used.

$$\begin{aligned}ITDF_{-64,63} = [&0, 0, 0, 0, 0, 0, 0, 0, 0, 0, 0, 0, 0, 0, 0, 0,\\ &0, 1+j, 0, 0, 0, 0, 0, 0, 0, -1, -j, 0, 0, 0, 0, 0,\\ &0, 0, 1+j, 0, 0, 0, 0, 0, 0, 0, -1-j, 0, 0, 0, 0, 0,\\ &0, 0, -1-j, 0, 0, 0, 0, 0, 0, 0, 1+j, 0, 0, 0, 0, 0,\\ &0, 0, 0, 0, 0, 0, 0, 0, 0, 0, -1-j, 0, 0, 0, 0, 0,\\ &0, -1-j, 0, 0, 0, 0, 0, 0, 0, 1+j, 0, 0, 0, 0, 0, 0,\\ &0, 1+j0, , 0, 0, 0, 0, 0, 0, 0, 1+j, 0, 0, 0, 0, 0, 0,\\ &0, 1+j, 0, 0, 0, 0, 0, 0, 0, 0, 0, 0, 0, 0, 0, 0,] * \sqrt{2}\end{aligned}$$ [Equation 1]

($ITDF_{-64,63}$ is a vector representing 128 IFFT input signals.)

Figure 8:
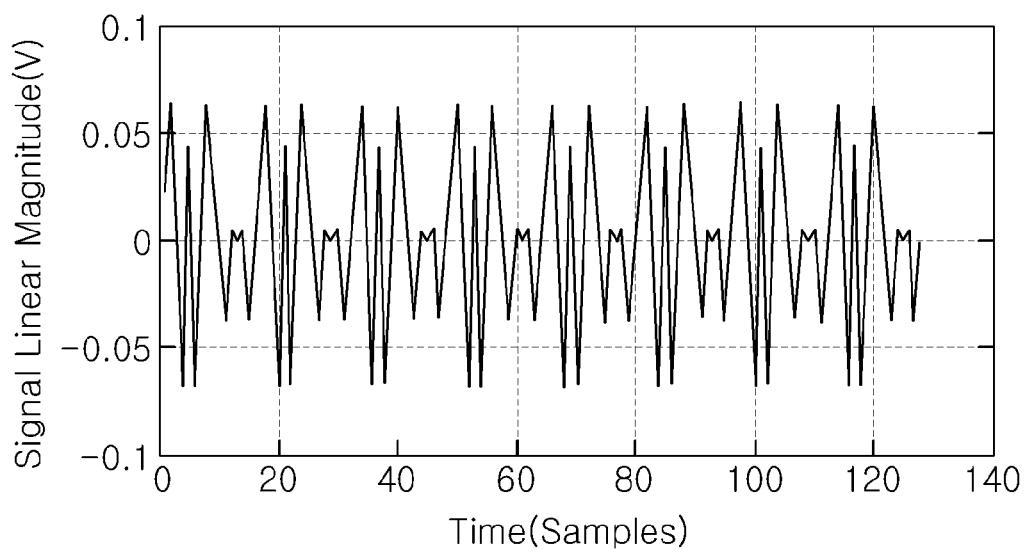
FIG. 8 is a graph showing a time domain sequence generated by a 128 IFFT input value shown in Equation 1.

An output value of 128 IFFT generated by the 128 IFFT input value shown in Equation 1 is shown in a graph shown in FIG. 8.

FIG. 8 is a graph showing a time domain sequence generated by a 128 IFFT input value shown in Equation 1.

Referring to FIG. 8, the time domain sequence is repeated every 16 samples.

Figure 9:
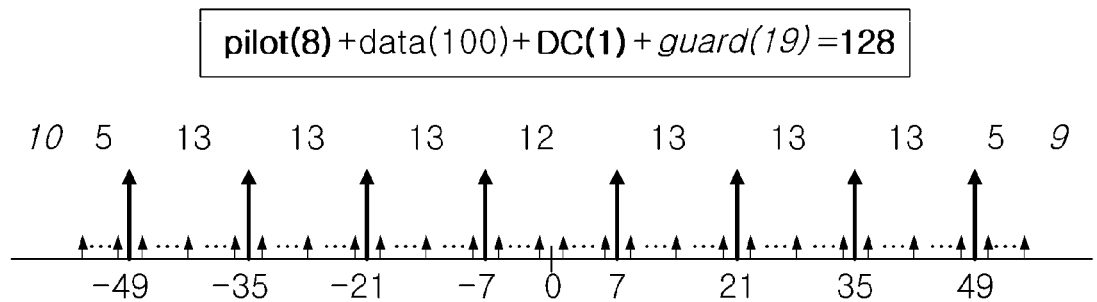
FIG. 9 is a diagram showing a logical frequency subcarrier configuration of a smart utility network channel according to an embodiment of the present invention.

FIG. 9 is a diagram showing a logical frequency subcarrier configuration of a smart utility network channel according to an embodiment of the present invention.

Referring to FIG. 9, the smart utility network system having the 128 FFT size uses 8 logical frequency subcarriers as a pilot subcarrier, 100 logical frequency subcarriers as a data subcarrier, 19 logical frequency subcarriers as a guard subcarrier, and 1 logical frequency subcarrier as a DC tone among 128 logical frequency subcarriers.

In FIG. 9, the logical frequency subcarrier marked by a long arrow corresponds to the pilot subcarrier and the logical frequency subcarrier marked by a short arrow corresponds to the data subcarrier.

A number positioned at the lower part of the graph of FIG. 9 represents a logical frequency subcarrier index (index 0 is DC) and a number positioned at the upper part represents numbers (total 100) of the data subcarriers between the pilot subcarriers (or guard subcarriers). A number marked in italics, which is positioned at both ends of numbers on the upper part of the graph represents the number of the guard subcarrier.

8 pilot subcarriers shown in FIG. 9 are allocated by Equation 2 shown below.

$$\text{Pilots}_{-54,54} = [0, 0, 0, 0, 0, -1, 0, 0, 0, 0, 0, 0, 0, 0,$$
$$0, 0, 0, 0, 0, 1, 0, 0, 0, 0, 0, 0, 0, 0, 0, 0, 0, 0,$$
$$-1, 0, 0, 0, 0, 0, 0, 0, 0, 0, 0, 0, 0, 0, -1, 0, 0, 0, 0,$$
$$0, 0, 0, 0, 0, 0, 0, 0, 0, -1, 0, 0, 0, 0, 0, 0, 0, 0, 0,$$
$$0, 0, 0, 0, -1, 0, 0, 0, 0, 0, 0, 0, 0, 0, 0, 0, 0, 1,$$
$$0, 0, 0, 0, 0, 0, 0, 0, 0, 0, 0, 0, 0, -1, 0, 0, 0, 0, 0]$$
[Equation 2]

(Pilots$_{-54,54}$ are vectors corresponding to all logical frequency subcarriers except for the guard subcarriers, numbers other than 0 are the pilot subcarriers, and 0 is the data subcarrier or the DC tone.)

In order to implement the smart utility network system with low power consumption, interference in an adjacent channel needs to be minimized while maintaining the sampling clock. In order to achieve the object, it is advantageous that many guard subcarriers that do not actually transmit data are provided. However, when the number of the data subcarriers actually transmitting the data decreases, the data rate decreases and even though too less pilot subcarriers are allocated, a synchronization algorithm performance cannot be maintained in the receiver.

Accordingly, it is very important to allocate as many guard subcarriers as possible while satisfying the synchronization performance and the data rate required in the smart utility network by considering all the above conditions such that the logical frequency subcarrier configuration shown in FIG. 9 may be efficiently utilized in the smart utility network.

Since the smart utility network system primarily aims at electric power, gas, water supply consumption measurements, etc., the smart utility network system does not require a very high data rate. In order to configure a wireless network for the electric power, gas, and water supply consumption measurements, etc., the required data rate of the smart utility network system is in the range of approximately 40 kbps to 1000 kbps and since an instrument may be positioned in a basement or at the corner of a building, a high-link margin design is required.

Figure 10:
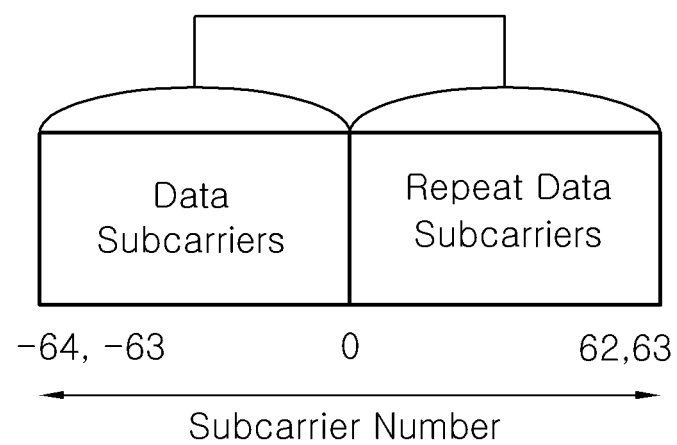
FIG. 10 is a diagram showing frequency domain spreading according to an embodiment of the present invention.
Figure 11:
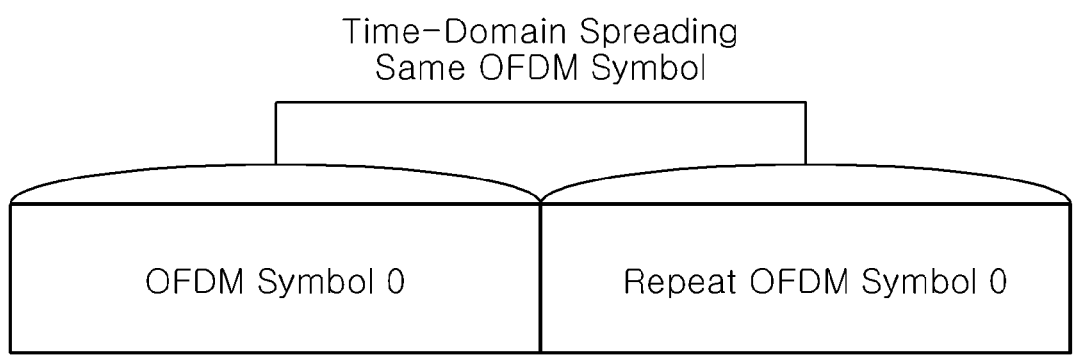
FIG. 11 is a diagram showing time domain spreading according to an embodiment of the present invention.

In order to satisfy the requirements, the smart utility network system according to the embodiment of the present invention uses only BPSK and QPSK modulation schemes having the most excellent performance among digital modulation schemes and uses frequency domain spreading shown in FIG. 10 and time domain spreading shown in FIG. 11 in order to improve receiving ability.

FIG. 10 is a diagram showing frequency domain spreading according to an embodiment of the present invention.

Referring to FIG. 10, different subcarriers repetitively transmit the same data.

FIG. 11 is a diagram showing time domain spreading according to an embodiment of the present invention.

Referring to FIG. 11, the same data is repetitively transmitted at different times.

Table 1 shown below is a table showing a data rate mode of the smart utility network communicating method using the TV white space according to the embodiment of the present invention.

TABLE 1

| Data rate (Kbps) | Modulation | Coding rate (R) | Processing gain (Time domain repetition Or/And Frequency domain repetition) |
|---|---|---|---|
| 97.7 | BPSK | ½ | 4 |
| 195.3 | BPSK | ½ | 2 |
| 390.6 | BPSK | ½ | 1 |
| 781.3 | QPSK | ½ | 1 |

As shown in Table 1, since the smart utility network communicating method using the TV white space according to the embodiment of the present invention uses only the BPSK and QPSK modulation schemes, a synchronization module design is simple and since the method uses only a basic coding rate, a low-power consumption system can be easily designed without installing a puncturer in the transmitter and a de-puncturer in the receiver.

The smart utility network communicating method using the TV white space according to the embodiment of the present invention can implement a low-price system and overcome the fading caused due to the multipath delay of 20 us or more without causing an excessive throughput loss by using the crystal having a frequency offset tolerance of +/−20 ppm through the time domain sequence having a repetitious cycle of 16 samples and the OFDM symbol configuration constituted by 160 samples, which uses the 128 IFFT/FET structure. Further, a transmission/reception structure can be simply configured using only the BPSK and QPSK as the modulation/demodulation scheme and an interference influence due to adjacent channels can be minimized even though four smart utility network channels are configured in one TV band by providing 128 FFT logical frequency subcarrier capable of providing 19 guard subcarriers.

Furthermore, since the smart utility network communicating method using the TV white space according to the embodiment of the present invention uses only a basic 1/2 coding rate, the puncturer in the transmitter and the de-puncturer in the receiver are not needed and since the method uses the frequency domain spreading and the time domain spreading in a TV white space band having excellent wireless transmission characteristics, the method can achieve a high link margin ensuring a normal operation even in an environment such as the basement.

Parameters and data rate modes of the smart utility network communicating method can be summarized as shown in Table 2, which is capable of supporting three or more piconets at once, allowing the frequency offset tolerance of 20 ppm for implementing the low-cost system, and enduring the multipath delay of 20 us or more by using the TV white space according to the embodiment of the present invention.

TABLE 2

| | Parameters | Values |
|---|---|---|
| Logical Frequency Sub carrier structure | Sampling Frequency | 1.25 MHz |
| | FFT Size | 128 |
| | Number of data subcarriers | 100 |
| | Number of pilot subcarriers | 8 |
| | Number of DC null tones | 1 |
| | Number of guard subcarriers | 19 |
| | Subcarrier frequency spacing | 1.25 MHz/128 = 9.765625 KHz |
| | Occupied BandWidth | (100 + 8 + 1) * 9.765625 KHz ≈ 1.06 MHz |
| Time-domain sequence | Number of samples | 16 |
| | Symbol period | 0.8 us * 16 = 12.8us |
| CE sequence | Number of samples in CP | 32 |
| Header OFDM symbol | CP duration | 0.8 us * 32 = 25.6 us |
| Payload OFDM symbol | Number of samples in IFFT output | 128 |
| | IFFT output duration | 0.8 us * 128 = 102.4 us |
| | Number of samples in symbol | 160 |
| | Symbol interval | 0.8 us * 160 = 128 us |
| | Symbol rate | 1/128 us = 7.8125 KHz |
| Data rate Mode | BPSK ½ rate coded and 4X repetition | 7.8125 KHz * 100 * ½ * ¼ ≈ 97.7 KHz |
| | BPSK ½ rate coded and 2X repetition | 7.8125 KHz * 100 * ½ * ½ ≈ 195.3 KHz |
| | BPSK ½ rate coded | 7.8125 KHz * 100 * ½ ≈ 390.6 KHz |
| | QPSK ½ rate coded | 7.8125 KHz * 200 * ½ ≈ 781.3 KHz |

The smart utility network communicating method described according to the embodiment of the present invention may be designed by considering an operation at the maximum RF frequency of approximately 700 MHz. When the RF operating frequency is changed, the timing specifications disclosed in this patent may be changed as shown in Equation 3 in order to reduce an occupied frequency bandwidth in accordance with a new RF operating frequency.

$$\frac{700 \text{ MHz}}{\text{New\_RF(MHz)}} = \frac{1250(\text{KHz})}{\text{New\_Sampling\_clock(KHz)}} \quad \text{[Equation 3]}$$

(New_RF(MHz) is the new RF operating frequency and New_Sampling_clock(KHz) is a new sampling clock frequency.)

For example, if the new RF operating frequency is defined as 350 MHz or less, the new sampling clock frequency may be 625 KHz.

Figure 12:
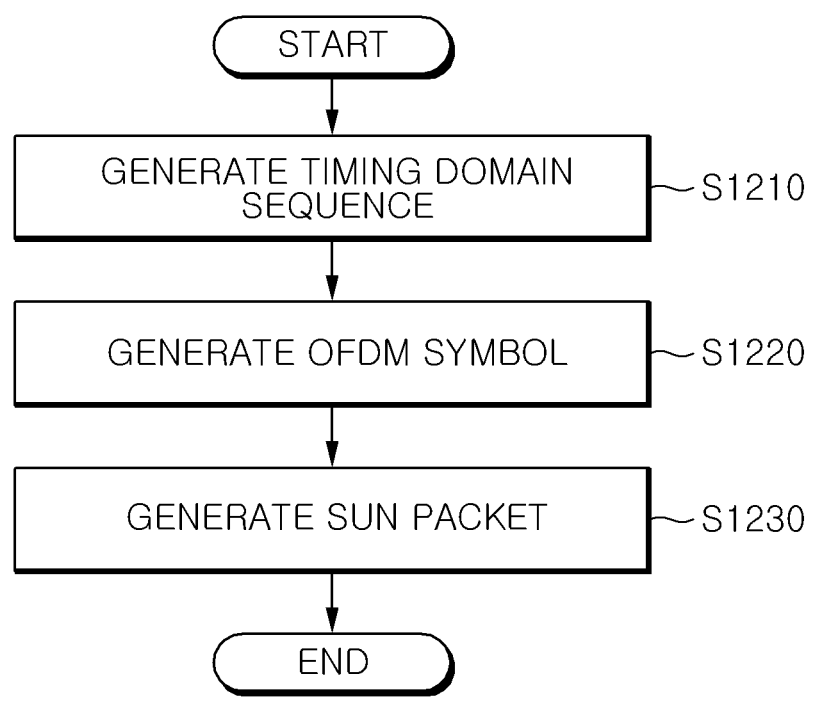
FIG. 12 is an operational flowchart showing a method of communicating for a smart utility network using a TV white space according to an embodiment of the present invention.

FIG. 12 is an operational flowchart showing a method of communicating for a smart utility network using a TV white space according to an embodiment of the present invention.

Referring to FIG. 12, the smart utility network communicating method using the TV white space according to the embodiment of the present invention generates the repeated time domain sequence for every sample of a predetermined number (S1210).

In this case, the predetermined number of the samples may be 16.

In this case, the samples may be sampled by the sampling clock frequency set to allocate four smart utility network channels to one TV channel band. For example, the TV channel band may be 6 MHz and the sampling clock frequency may be 1.25 MHz.

In this case, the time domain sequence may be generated by the 128 IFFT using Equation 1 as an input.

Further, the smart utility network communicating method using the TV white space generates an OFDM symbol having a cyclic prefix length equal to a value dividing the FFT size by a natural number of 2 or more and including samples of a number equal to the sum of the FFT size and the cyclic prefix length (S1220).

In this case, the samples may be sampled by the sampling clock frequency set to allocate four smart utility network channels to one TV channel band. For example, the TV channel band may be 6 MHz and the sampling clock frequency may be 1.25 MHz.

Presently, the natural number of 2 or more may be 4 and the FFT size may be 128. Further, the cyclic prefix may include 32 samples and the OFDM symbol may include 160 symbols.

Next, the smart utility network communicating method using the TV white space generates an SUN packet to be transmitted through a TV channel band selected in the TV white space by using the time domain sequence and the OFDM symbol (S1230).

In this case, each of the smart utility network channels may include 128 logical frequency subcarriers including 19 guard subcarriers, 8 pilot subcarriers, the DC tone, and 100 data subcarriers.

In this case, 8 pilot subcarriers may be allocated to correspond to Equation 2.

The SUN packet may include the time domain sequence and the channel estimation sequence, the header, and the payload generated using the OFDM symbol.

In this case, the smart utility network communicating method shown in FIG. 12 may use 1/2 coding rate, use any one modulation/demodulation scheme of the BPSK and the QPSK, and use at least one of the frequency domain spreading and the time domain spreading.

The steps shown in FIG. 12 may be performed in the order shown in FIG. 12, the reverse order thereof, or at the same time.

Figure 13:
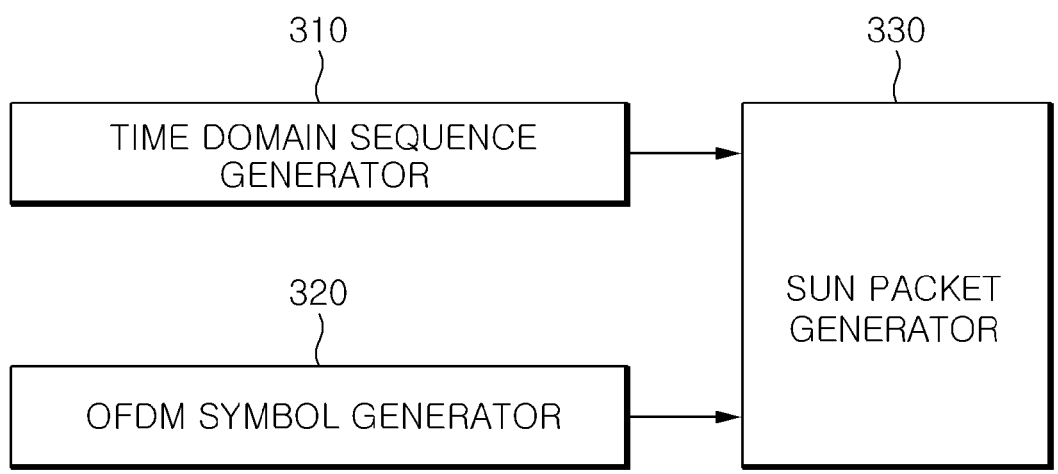
FIG. 13 is a block diagram showing an apparatus of communicating for a smart utility network using a TV white space according to an embodiment of the present invention.

FIG. 13 is a block diagram showing an apparatus of communicating for a smart utility network using a TV white space according to an embodiment of the present invention.

Referring to FIG. 13, the smart utility network communicating apparatus using the TV white space includes a time domain sequence generator 310, an OFDM symbol generator 320, and an SUN packet generator 330.

The time domain sequence generator 310 generates a time domain sequence repeated for every sample of a predetermined number.

In this case, the predetermined number of the samples may be 16.

In this case, the time domain sequence generator 310 may generate by 128 IFFT using Equation 1 as an input.

The OFDM symbol generator 320 generates an OFDM symbol having a cyclic prefix length equal to a value dividing the FFT size by a natural number of 2 or more and including samples of a number equal to the sum of the FFT size and the cyclic prefix length.

In this case, the natural number of 2 or more may be 4, the FFT size may be 128, and the cyclic prefix length may be 32. Further, the OFDM symbol may include 160 samples.

In this case, the samples of the time domain sequence and the samples of the OFDM symbol may be sampled by the sampling clock frequency set to allocate four smart utility network channels to one TV channel band. In this case, the TV channel band may be 6 MHz and the sampling clock frequency may be 1.25 MHz.

Presently, each of the smart utility channels may include 128 logical frequency subcarriers including 19 guard subcarriers and 8 pilot subcarriers. In this case, 8 pilot subcarriers may be allocated to correspond to Equation 2.

The SUN packet generator 330 generates an SUN packet to be transmitted through a TV channel band selected in the TV white space by using the time domain sequence and the OFDM symbol.

In this case, the SUN packet generator 330 may generate the SUN packet including the time domain sequence and the channel estimation sequence, the header, and the payload generated using the OFDM symbol.

The smart utility network communicating apparatus shown in FIG. 13 may secure a processing gain by using 1/2 coding rate, using any one modulation/demodulation scheme of the BPSK and the QPSK, and using at least one of the frequency domain spreading and the time domain spreading.

As described above, a method and an apparatus of communicating for a smart utility network using a TV white space according to an embodiment of the present invention are not limited to the configuration and method of the embodiments described as above, but the embodiments may be configured by selectively combining all the embodiments or some of the embodiments so that various modifications can be made.

What is claimed is:

1. A method of communicating for a smart utility network, comprising:
   generating a time domain sequence that is repeated every predetermined number of samples;
   generating an OFDM symbol having a cyclic prefix length corresponding to a Fourier transform size divided by a natural number of 2 or more and including samples of a number corresponding to the sum of the Fourier transform size and the cyclic prefix length; and
   generating an SUN packet by using the time domain sequence and the OFDM symbol,
   wherein the predetermined number of samples correspond to the Fourier transform size divided by 8 so that the repetitions occur 8 times in each OFDM symbol except the cyclic prefix.

2. The method of communicating for a smart utility network of claim 1, wherein the predetermined number of samples is 16.

3. The method of communicating for a smart utility network of claim 2, wherein the samples of the time domain sequence and the samples of the OFDM symbol are sampled by a sampling clock frequency set to allocate four smart utility network channels to the selected TV channel band.

4. The method of communicating for a smart utility network of claim 3, wherein the TV channel band corresponds to 6 MHz band and the sampling clock frequency corresponds to 1.25 MHz.

5. The method of communicating for a smart utility network of claim 4, wherein each of the smart utility network channels includes: 128 logical frequency subcarriers including 19 guard subcarriers; and 8 pilot subcarriers.

6. The method of communicating for a smart utility network of claim 1, wherein the Fourier transform size is 128, the cyclic prefix length is 32, and the OFDM symbol includes 160 samples.

7. The method of communicating for a smart utility network of claim 1, wherein the SUN packet includes the time domain sequence and a channel estimation sequence, a header, and a payload generated using the OFDM symbol.

8. The method of communicating for a smart utility network of claim 2, wherein the time domain sequence is generated by 128 IFFT using the following Equation 2 as an input:

$$ITDF_{-64,63} = [0, 0, 0, 0, 0, 0, 0, 0, 0, 0, 0, 0, 0, 0, 0,$$
$$0, 1+j, 0, 0, 0, 0, 0, 0, 0, -1-j, 0, 0, 0, 0, 0, 0,$$
$$0, 1+j, 0, 0, 0, 0, 0, 0, 0, -1-j, 0, 0, 0, 0, 0, 0,$$
$$0-1-j, 0, 0, 0, 0, 0, 0, 0, 1+j, 0, 0, 0, 0, 0, 0,$$
$$0, 0, 0, 0, 0, 0, 0, 0, 0, -1-j, 0, 0, 0, 0, 0, 0, 0,$$
$$-1-j, 0, 0, 0, 0, 0, 0, 0, 1+j, 0, 0, 0, 0, 0, 0, 0,$$
$$1+j, 0, 0, 0, 0, 0, 0, 0, 1+j, 0, 0, 0, 0, 0, 0, 0,$$
$$1+j, 0, 0, 0, 0, 0, 0, 0, 0, 0, 0, 0, 0, 0, 0, 0] * \sqrt{2}$$
[Equation 2]

wherein $ITDF_{-64,63}$ is a vector representing 128 IFFT input signals.

9. The method of communicating for a smart utility network of claim 1, wherein the smart utility network communicating method uses 1/2 coding rate, uses any one modulation/demodulation scheme of BPSK and QPSK, and uses at least one of frequency domain spreading and time domain spreading.

10. A method of communicating for a smart utility network, comprising:
   generating a time domain sequence repeated every predetermined number of samples;
   generating an OFDM symbol having a cyclic prefix length corresponding to an FFT size divided by a natural number of 2 or more and including samples of a number corresponding to the sum of the FFT size and the cyclic prefix length; and
   generating an SUN packet to be transmitted through a TV channel band selected in the TV white space by using the time domain sequence and the OFDM symbol,
   wherein the predetermined number of samples is 16,
   wherein the samples of the time domain sequence and the samples of the OFDM symbol are sampled by a sampling clock frequency set to allocate four smart utility network channels to the selected TV channel band,
   wherein the TV channel band corresponds to 6 MHz band and the sampling clock frequency corresponds to 1.25 MHz, wherein each of the smart utility network channels includes: 128 logical frequency subcarriers including 19 guard subcarriers; and 8 pilot subcarriers, wherein the 8 pilot subcarriers are allocated to correspond to the following Equation 1:

$$Pilots_{-54,54} = [0, 0, 0, 0, 0, -1, 0, 0, 0, 0, 0, 0, 0, 0,$$
$$0, 0, 0, 0, 0, 1, 0, 0, 0, 0, 0, 0, 0, 0, 0, 0, 0, 0,$$
$$-1, 0, 0, 0, 0, 0, 0, 0, 0, 0, 0, 0, 0, 0, -1, 0, 0, 0, 0,$$
$$0, 0, 0, 0, 0, 0, 0, 0, 0, -1, 0, 0, 0, 0, 0, 0, 0, 0, 0, 0,$$
$$0, 0, 0, 0, -1, 0, 0, 0, 0, 0, 0, 0, 0, 0, 0, 0, 0, 0, 1,$$
$$0, 0, 0, 0, 0, 0, 0, 0, 0, 0, 0, 0, 0, -1, 0, 0, 0, 0, 0] \quad [\text{Equation 1}]$$

wherein $Pilots_{-54,54}$ is a vector corresponding to all logical frequency subcarriers except for the guard subcarriers, numbers other than 0 are the pilot subcarriers, and 0 is the data subcarrier or the DC tone.

11. An apparatus of communicating for a smart utility network, comprising:
a time domain sequence generator generating a time domain sequence that is repeated every predetermined number of samples;
an OFDM symbol generator generating an OFDM symbol having a cyclic prefix length corresponding to a Fourier transform size divided by a natural number of 2 or more and including samples of a number corresponding to the sum of the Fourier transform size and a cyclic prefix length; and
an SUN packet generator generating an SUN packet by using the time domain sequence and the OFDM symbol,
wherein the predetermined number of samples correspond to the Fourier transform size divided by 8 so that the repetitions occur 8 times in each OFDM symbol except the cyclic prefix.

12. The apparatus of communicating for a smart utility network of claim 11, wherein the predetermined number of samples is 16.

13. The apparatus of communicating for a smart utility network of claim 12, wherein the samples of the time domain sequence and the samples of the OFDM symbol are sampled by a sampling clock frequency set to allocate four smart utility network channels to the selected TV channel band.

14. The apparatus of communicating for a smart utility network of claim 13, wherein the TV channel band corresponds to 6 MHz and the sampling clock frequency corresponds to 1.25 MHz.

15. The apparatus of communicating for a smart utility network of claim 14, wherein each of the smart utility network channels includes: 128 logical frequency subcarriers including 19 guard subcarriers; and 8 pilot subcarriers.

16. The apparatus of communicating for a smart utility network of claim 11, wherein the Fourier transform size is 128, the cyclic prefix length is 32, and the OFDM symbol includes 160 samples.

17. The apparatus of communicating for a smart utility network of claim 11, wherein the SUN packet generator generates the SUN packet including the time domain sequence and a channel estimation sequence, a header, and a payload generated using the OFDM symbol.

18. The apparatus of communicating for a smart utility network of claim 12, wherein the time domain sequence generator generates the time domain sequence by 128 IFFT using the following Equation 2 as an input:

$$ITDF_{-64,63} = [0, 0, 0, 0, 0, 0, 0, 0, 0, 0, 0, 0, 0, 0, 0,$$
$$0, 1+j, 0, 0, 0, 0, 0, 0, 0, -1-j, 0, 0, 0, 0, 0, 0,$$
$$0, 1+j, 0, 0, 0, 0, 0, 0, 0, -1-j, 0, 0, 0, 0, 0, 0,$$
$$0 - 1-j, 0, 0, 0, 0, 0, 0, 0, 1+j, 0, 0, 0, 0, 0, 0,$$
$$0, 0, 0, 0, 0, 0, 0, 0, 0, -1-j, 0, 0, 0, 0, 0, 0, 0,$$
$$-1-j, 0, 0, 0, 0, 0, 0, 0, 1+j, 0, 0, 0, 0, 0, 0, 0,$$
$$1+j, 0, 0, 0, 0, 0, 0, 0, 1+j, 0, 0, 0, 0, 0, 0, 0,$$
$$1+j, 0, 0, 0, 0, 0, 0, 0, 0, 0, 0, 0, 0, 0, 0] * \sqrt{2} \quad [\text{Equation 2}]$$

wherein $ITDF_{-64,63}$ is a vector representing 128 IFFT input signals.

19. The apparatus of communicating for a smart utility network of claim 11, wherein the smart utility network communicating apparatus uses 1/2 coding rate, uses any one modulation/demodulation scheme of BPSK and QPSK, and uses at least one of frequency domain spreading and time domain spreading.

20. An apparatus of communicating for a smart utility network, comprising:
a time domain sequence generator generating a time domain sequence repeated every predetermined number of samples;
an OFDM symbol generator generating an OFDM symbol having a cyclic prefix length corresponding to an FFT size divided by a natural number of 2 or more and including samples of a number corresponding to the sum of the FFT size and a cyclic prefix length; and
an SUN packet generator generating an SUN packet to be transmitted through a TV channel band selected in the TV white space by using the time domain sequence and the OFDM symbol,
wherein the predetermined number of samples is 16,
wherein the samples of the time domain sequence and the samples of the OFDM symbol are sampled by a sampling clock frequency set to allocate four smart utility network channels to the selected TV channel band,
wherein the TV channel band corresponds to 6 MHz and the sampling clock frequency corresponds to 1.25 MHz,
wherein each of the smart utility network channels includes: 128 logical frequency subcarriers including 19 guard subcarriers; and 8 pilot subcarriers,
wherein the 8 pilot subcarriers are allocated to correspond to the following Equation 1:

$$Pilots_{-54,54} = [0, 0, 0, 0, 0, -1, 0, 0, 0, 0, 0, 0, 0, 0,$$
$$0, 0, 0, 0, 0, 1, 0, 0, 0, 0, 0, 0, 0, 0, 0, 0, 0, 0,$$
$$-1, 0, 0, 0, 0, 0, 0, 0, 0, 0, 0, 0, 0, 0, -1, 0, 0, 0, 0,$$
$$0, 0, 0, 0, 0, 0, 0, 0, 0, -1, 0, 0, 0, 0, 0, 0, 0, 0, 0, 0,$$
$$0, 0, 0, 0, -1, 0, 0, 0, 0, 0, 0, 0, 0, 0, 0, 0, 0, 0, 1,$$
$$0, 0, 0, 0, 0, 0, 0, 0, 0, 0, 0, 0, 0, -1, 0, 0, 0, 0, 0] \quad [\text{Equation 1}]$$

wherein $Pilots_{-54,54}$ is a vector corresponding to all logical frequency subcarriers except for the guard subcarriers, numbers other than 0 are the pilot subcarriers, and 0 is the data subcarrier or the DC tone.

* * * * *